April 17, 1962 M. A. POLSTER 3,030,608
DETECTOR FOR HIGH-SPEED TRAFFIC
Filed Oct. 12, 1959 7 Sheets-Sheet 1
FIG. IA.
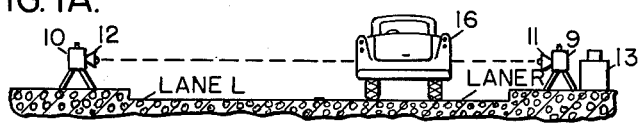
FIG. IB.
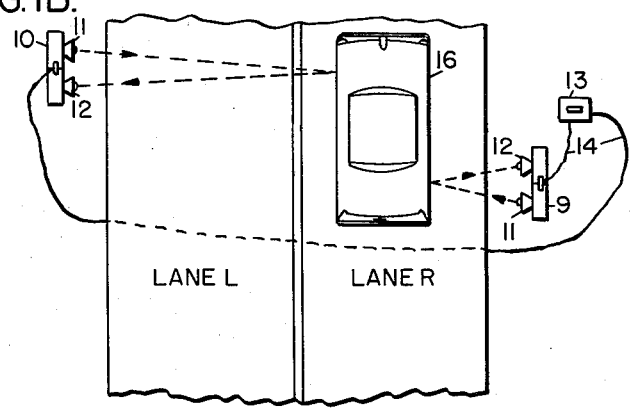
FIG. IC.
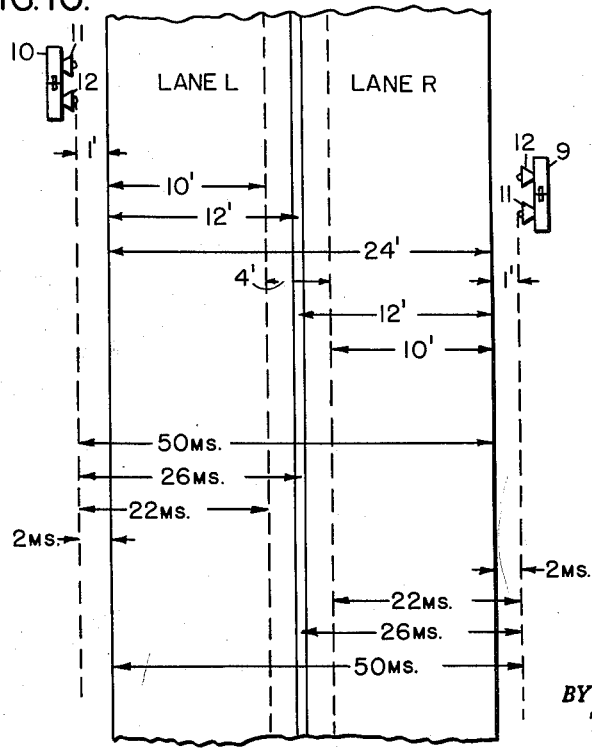
INVENTOR.
M. A. POLSTER
BY
HIS ATTORNEY

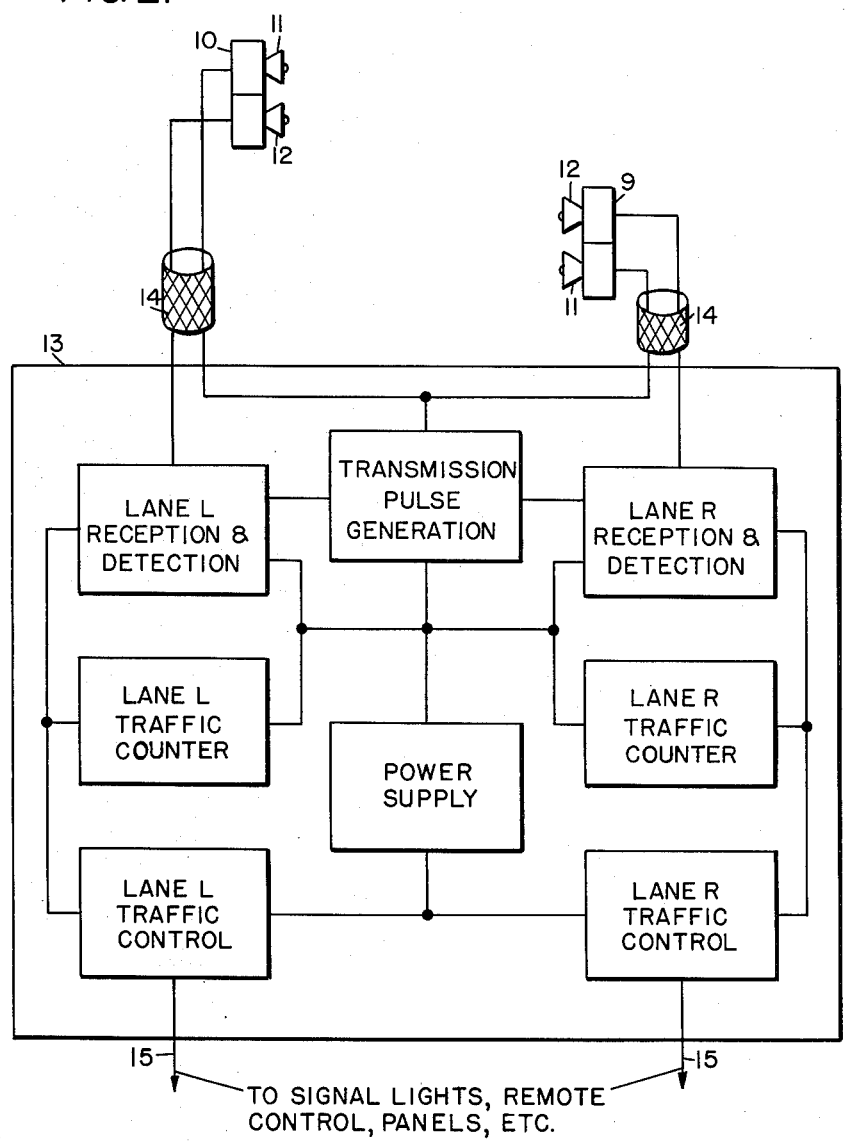

April 17, 1962  M. A. POLSTER  3,030,608
DETECTOR FOR HIGH-SPEED TRAFFIC
Filed Oct. 12, 1959  7 Sheets-Sheet 3

INVENTOR.
M. A. POLSTER
BY
HIS ATTORNEY

April 17, 1962   M. A. POLSTER   3,030,608
DETECTOR FOR HIGH-SPEED TRAFFIC
Filed Oct. 12, 1959   7 Sheets-Sheet 5

INVENTOR.
M. A. POLSTER
BY
HIS ATTORNEY

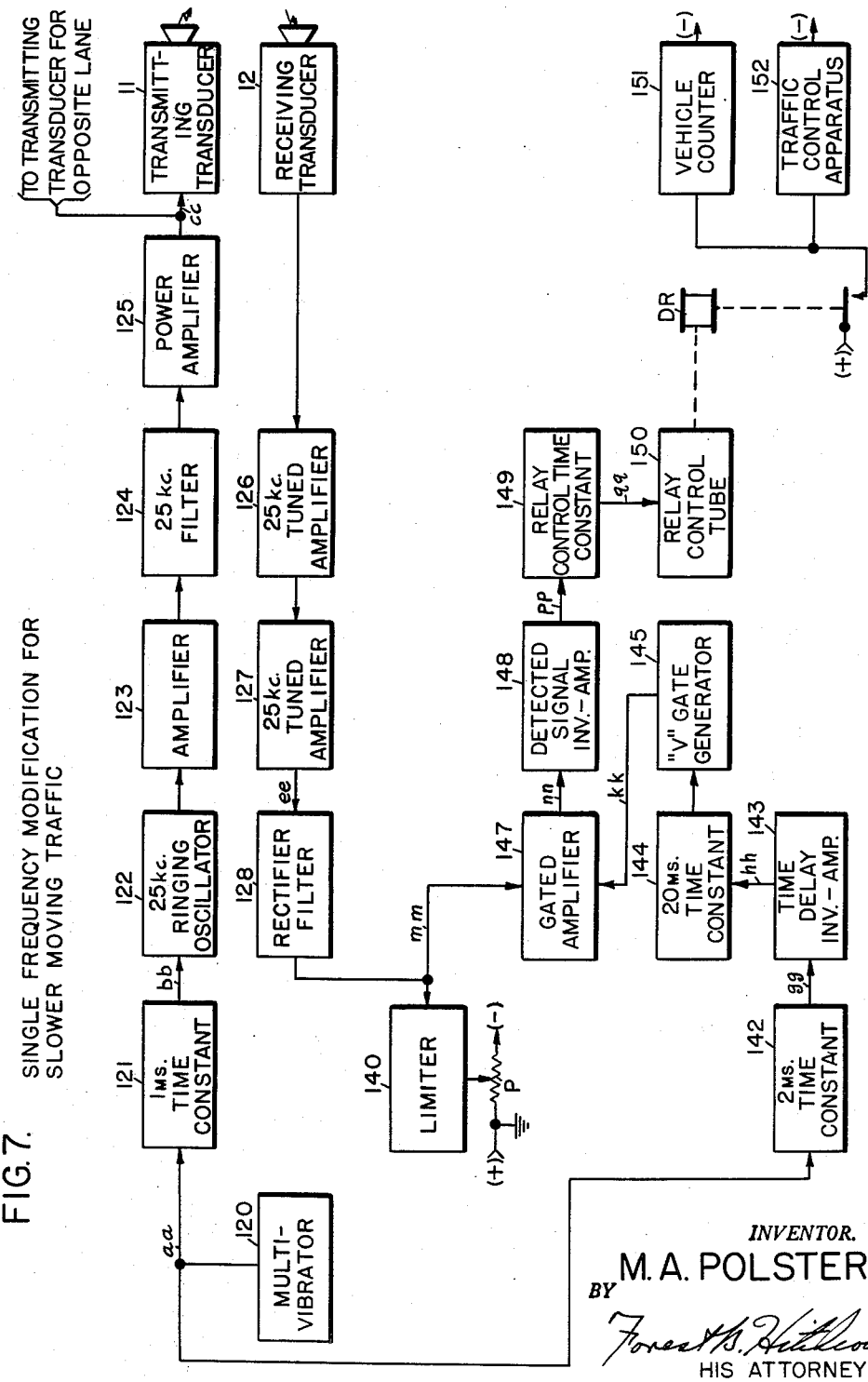
FIG. 7. SINGLE FREQUENCY MODIFICATION FOR SLOWER MOVING TRAFFIC
INVENTOR.
M. A. POLSTER
BY Forest S. Hitchcock
HIS ATTORNEY

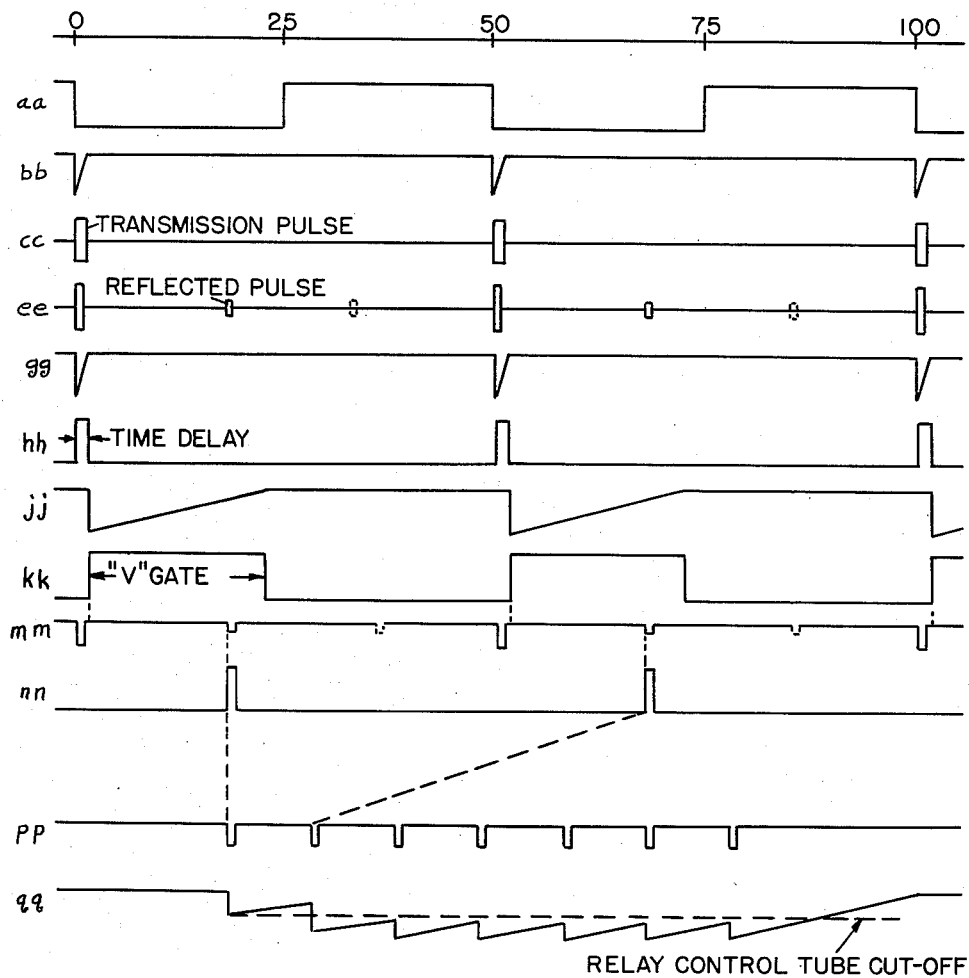

United States Patent Office 3,030,608
Patented Apr. 17, 1962

3,030,608
DETECTOR FOR HIGH-SPEED TRAFFIC
Morton A. Polster, Rochester, N.Y., assignor to General Railway Signal Company, Rochester, N.Y.
Filed Oct. 12, 1959, Ser. No. 845,810
10 Claims. (Cl. 340—38)

This invention relates to the detection of objects by sonic means and more particularly to sonic apparatus for detecting high-speed automotive traffic.

With the tremendous increase in highway traffic, highway engineers are constantly being faced with new problems, the solution of which requires accurate information concerning the number of highway vehicles passing along a particular given highway in each direction. This information is needed in order to determine the nature of highway alterations in anticipation in handling various traffic loads. Also, this information is often necessary in order to provide efficient control of traffic in a given area. The invention herein provides an accurate, economical method for obtaining this necessary traffic information, and it is equally adaptable to permanent or portable installations for the monitoring of both high-speed rural traffic and the lower speed traffic of metropolitan areas.

In the invention disclosed herein, intermittent pulses of sound energy are beamed across each highway lane being monitored. The frequency of each successive pulse of sound energy is alternated, and the pulse period of the successive pulses is made only long enough to allow for the reception of pulses reflected from vehicles passing along the particular lane being monitored. Reception and detection circuits are gated alternately to the two pulse frequencies so that reflected pulses pass through the detection circuits only when their frequency corresponds to that of the last transmitted pulse. In this way, pulses reflected from vehicles passing in the remote, non-monitored lane are received following the next successive transmission pulse and are rejected on the basis of frequency. This use of more than one transmission frequency permits the utilization of a high pulse repetition rate which, in turn, assures the discriminating detection of very high speed vehicles passing through the monitored lane.

When the invention is modified to monitor slower moving metropolitan traffic, a high pulse repetition rate is not essential and the circuitry is simplified. Only a single frequency is used and the intermittent sound pulses are sent out at a rate selected so that the time following each transmitted pulse is sufficient to allow for the reception of pulses reflected from vehicles passing anywhere in the entire roadway. However, the reception and detection circuits are gated to be responsive only during the time necessary for the reception of pulses reflected from vehicles in the monitored lane. Any pulses reflected from vehicles in the non-monitored lane are rejected by the gating circuits.

In both the high speed form and in the modified form, when a series of sonic pulses is reflected from the side of a passing vehicle and successfully passed through the gating circuits, it is converted to a series of negative pulses which build up a charge sufficient to cut off a relay control tube, allowing a detection relay to drop away and indicate the presence of the passing vehicle. This detection relay can be used to operate an impulse counter, or to control the operation of signal lights or other traffic control apparatus.

Also, based upon the physical fact that the amplitude of a reflected pulse varies inversely with the distance it travels, a limiting circuit is used to prevent the detection of remote objects located beyond the highway area.

It is a purpose of this invention to provide an accurate permanent or portable, system for separately detecting, or counting, or controlling traffic passing in opposite directions on a given highway.

It is a further purpose of this invention to provide a vehicle detection system utilizing pulsed sonic energy, which can be simply and economically set up on a given highway, for separately counting high speed vehicles passing a given point, and for maintaining a separate count for the traffic passing in each direction.

It is a further object of this invention to provide a system for detecting objects within a specified area by means of reflected sound energy where the transmitted beam of sound energy pulses can be allowed to travel beyond the particular area being monitored.

It is a further object of this invention to provide a system for detecting and discriminating high speed vehicles utilizing portable roadside apparatus.

Other objects, purposes and characteristic features of the present invention will be in part obvious from the accompanying drawings, and in part pointed out as the description of the invention, progresses.

In describing the invention in detail, reference will be made to the accompanying drawings, in which like reference characters designate corresponding parts throughout the several views, and in which:

FIGS. 1A and 1B are two views of the invention set up at a road side for monitoring traffic;

FIG. 1C is a view similar to FIG. 1B setting forth the approximate dimensions of the highway which the invention is assumed to be monitoring and the approximate transit time for a sound pulse to be transmitted and reflected back over these same distances, these assumed distances determining certain variable time constants in the circuits involved;

FIG. 2 is a block diagram showing the general circuit organization of the invention;

FIG. 7 is a detailed block diagram of a modification of the invention for use with slower moving traffic.

FIG. 8 is a chart of waveforms taken at key points in the circuit illustrated in FIG. 6.

Figure 3:
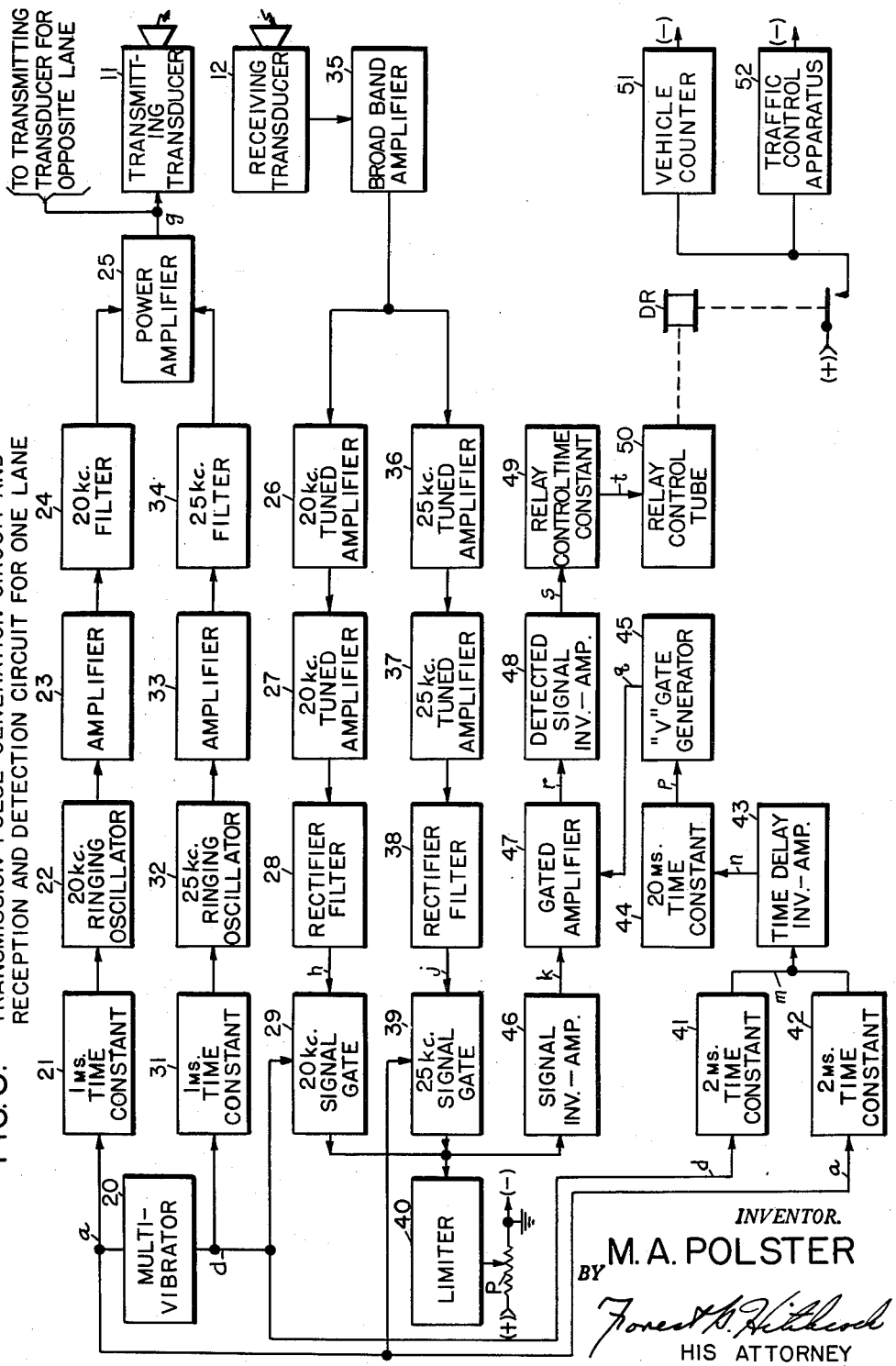
FIG. 3 is a detailed block diagram illustrating the transmission pulse generation circuit and one reception and detection circuit for one lane.

For the purpose of simplifying the illustration and facilitating in the explanation, the various parts and circuits constituting the embodiment of the invention have been shown by means of block diagrams, each block representing circuitry well-known in the art, the drawings having been made more with the purpose of making it easy to understand the principles and mode of operation, than with the idea of illustrating the specific construction and arrangement of parts that would be employed in practice.

*Portable Components*

While the following disclosure describes the components of the invention as being portable, it should be obvious that these components may be used in permanent installations. Also, in actual practice they would be protected from the weather by means of hoods or other suitable coverings.

FIGS. 1A and 1B show the invention set up to monitor the two lanes of a typical highway, designated Lane L and Lane R. The assumed dimensions of the highway are set out in FIG. 1C along with the approximate transit times required for a transmitted sonic pulse to travel the distance shown by the arrows and then be reflected back to the transducer unit from which it was transmitted. (Speed of sound: closely approximated at 1 foot per millisecond.)

Two transducer units 9 and 10, each including a transmitting transducer 11 and a receiving transducer 12, are set up on opposite sides of the highway and staggered so that the sound energy beamed by each transmitting transducer will not be received by the receiving transducer of the opposite unit. Each transducer unit is connected to control box 13 by means of cables 14.

As illustrated in FIG. 2, control box 13 contains the complete operative circuits of the invention, including its own power supply. A single transmission pulse generation circuit operates both transmitting transducers 11 and triggers the separate reception and detection circuits. While separate counters for each traffic lane are contained in control box 13, line wires 15 must be used when the detector is to be utilized for controlling remote signals, lights, indications, etc.

Attention is called at this time to the fact that, in the following disclosure, the values of the time constants which determine the timing of the various gating circuits are based upon the arbitrarily assumed road dimensions shown in FIG. 1C, and that these values obviously must be varied in accordance with the dimensions of the particular highway being monitored.

It is believed that the nature of the invention, its advantages and characteristic features, can be best understood with further description being set forth from the standpoint of operation.

*Detection of High-Speed Traffic*

In describing the operation of the invention, reference will be made to the detailed block diagram in FIG. 3 which shows the transmission pulse generation circuit and the reception and detection circuit for only one lane. Since the two reception and detection circuits are duplicates, it will first be assumed that the reception and detection circuit shown in FIG. 3 is responsive to transducer unit 9 monitoring lane R, and then later it will be assumed that it is responsive to transducer unit 10 monitoring lane L.

Figure 4:
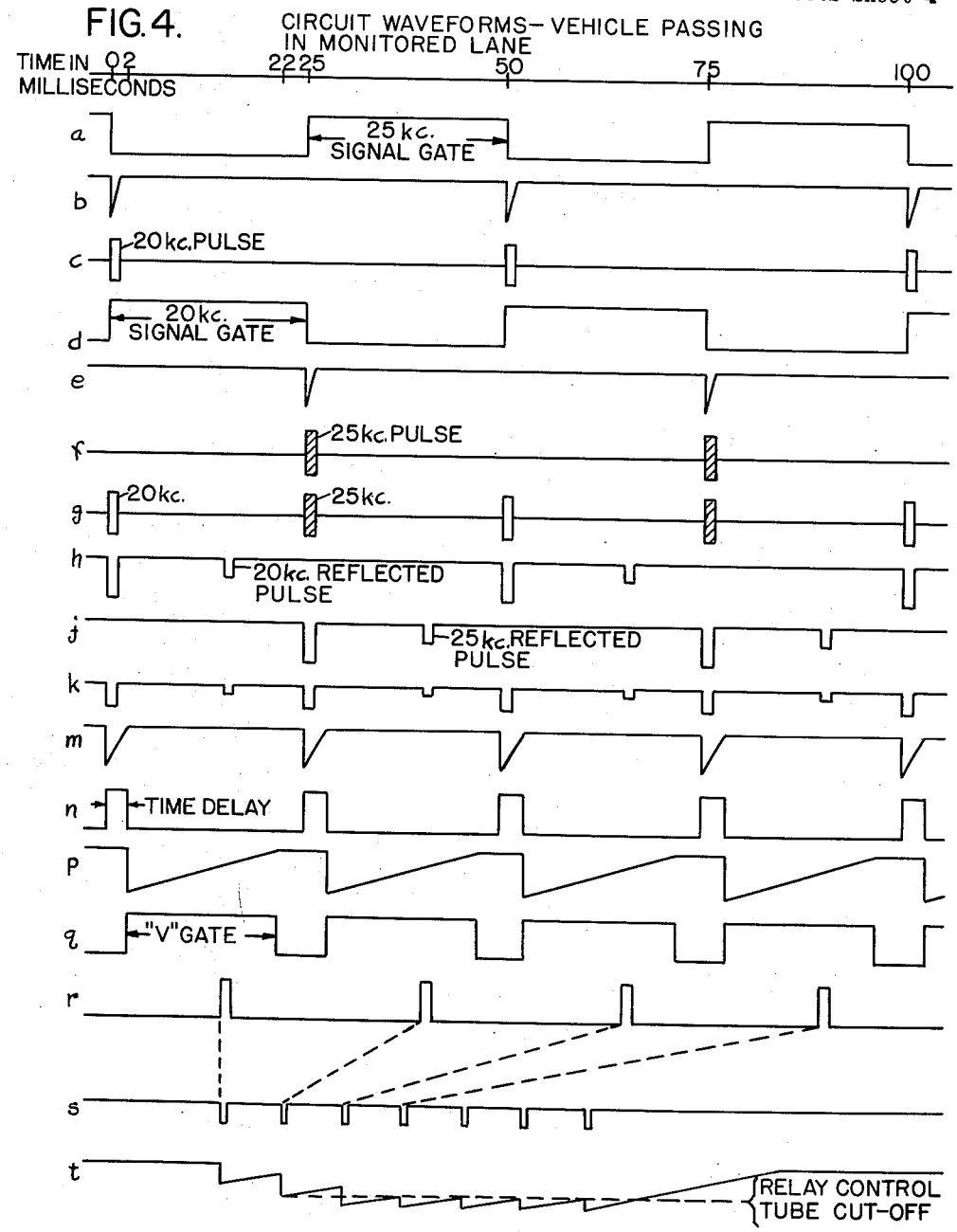
FIG. 4 is a chart showing waveforms at key points in the circuits illustrated in FIG. 3, assuming the passage of a vehicle through the monitored lane.
Figure 5:
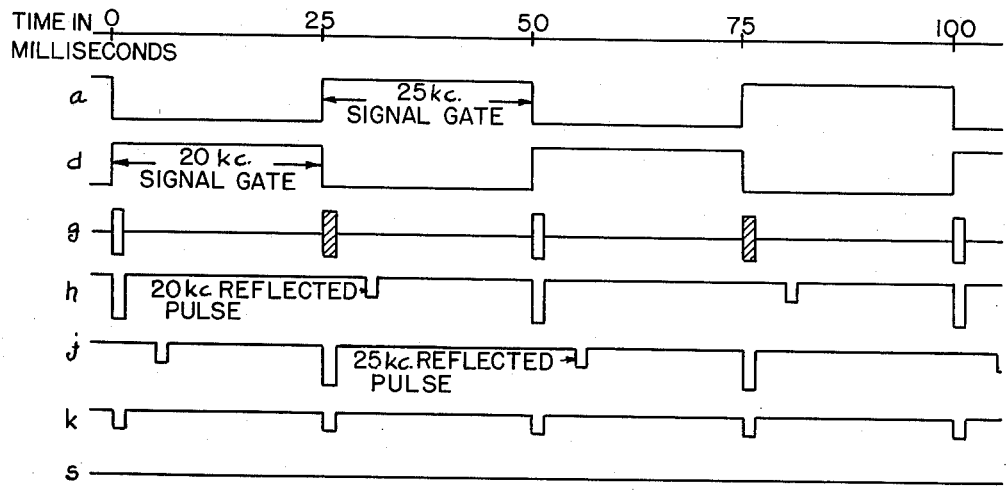
FIG. 5 is a chart showing certain of the waveforms of FIG. 4, assuming the passage of a vehicle through the non-monitored lane.

As the description progresses reference will also be made to FIGS. 4 and 5 which illustrate waveforms taken at similarly lettered points in FIG. 3. FIG. 4 applying to lane R reception and detection circuit responsive to transducer unit 9, and FIG. 5 applying to lane L reception and detection circuit responsive to transducer unit 10.

Referring now to FIG. 3 symmetrical multivibrator 20 is adjusted so that the time for one complete cycle is 50 milliseconds, each half cycle or flip-flop occurring every 25 milliseconds. This particular time is chosen so that each half cycle is approximately equivalent to the time required for a sound pulse to travel from transmitting transducer 11 across the monitored lane and back to receiving transducer 12 (see FIG. 1C). This half-cycle time for multivibrator 20 determines the pulse repetition rate for the detector, allowing time between each transmission pulse for the reception of sound pulses reflected from objects as far away as the center of the highway.

The negative-going portions of the square waves present at each side of multivibrator 20 (shown as waveforms *a* and *d* in FIG. 4) are each fed to one millisecond time constants 21 and 31, respectively, resulting in waveforms *b* and *e*. These negative one millisecond pulses are fed respectively to the grids of ringing oscillators 22 and 32, and momentarily excite each into oscillating at their respective resonant frequencies, as shown by waveforms *c* and *f*. For purposes of this disclosure, frequencies of 20 and 25 kilocycles, respectively, have been arbitrarily chosen for the oscillators, but any two easily distinguishable sonic frequencies will work as well.

These one millisecond pulses of 20 and 25 kc. energy are fed, respectively, through amplifiers 23 and 33 and filters 24 and 34 to power amplifier 25 whose output (waveform *g*) drives transmitting transducers 11. The transducers convert the electrical output of power amplifier 25 into sound energy in the form of a beam of intermittent, one millisecond pulses. These pulses alternate in frequency from 20 to 25 kc., and their pulse repetition rate, in this particular instance, is 25 pulses per second.

It will now be assumed that car 16 is travelling along lane R at approximately 90 m.p.h. and is passing through the detection zone monitored by the invention as illustrated in FIGS. 1A and 1B.

As the front of car 16 passes through the sonic beam emanating from transmitting transducer 11 of transducer unit 9, the pulses of sound energy impinging on the side of car 16 are reflected back into receiving transducer 12. These reflected pulses are first amplified by amplifier 35 and then are fed to the input of tuned amplifiers 26 and 36. Reflected 20 kc. pulses pass successively through tuned amplifiers 26 and 27 and rectifier-filter 28, while reflected 25 kc. pulses pass through tuned amplifiers 36 and 37 and rectifier-filter 38.

The outputs of rectifier-filters 28 and 38, shown respectively as waveforms *h* and *j*, are fed to signal gates 29 and 39. The gating potential for 20 kc. signal gate 29 is provided by one output of multivibrator 20 (waveform *d*) and allows reflected signals to pass if they are received at any time during the half-cycle of multivibrator 20 which triggers each 20 kc. transmission pulse. Similarly, 25 kc. signal gate 39 has its gating potential provided by the other output of multivibrator 20 (waveform *a*), and passes reflected signals only during the half-cycle which triggers each 25 kc. transmission pulse. Thus, signal gates 29 and 39 alternate, the one being "on" when the other is "off."

Since the side of car 16 passes less than 12 feet from transducer unit 9, the transit time for each reflected pulse of sound energy is less than the 24 millisecond period between successive transmitted pulses. This means that each reflected pulse of 20 kc. energy is received before the transmission of the following 25 kc. pulse and is passed by 20 kc. signal gate 29. Similarly, each 25 kc. reflected pulse is received before the transmission of the following 20 kc. pulse and is passed by 25 kc. signal gate 39.

In parallel with the output circuits of signal gates 29 and 39 is limiter 40 which is a simple diode limiter having its anode biased above ground in accordance with the setting of potentiometer P. Limiter 40 will be discussed further below, and at this point in the description it is sufficient to know that limiter 40 effectively sets a minimum potential which must be surpassed in order for a signal to continue through to the remaining detection circuits.

Therefore, only the peaks of the signals passed by both signal gates 29 and 39 are fed to signal inverter-amplifier 46, the output of which combines all signals passed by the reception circuits and is shown as waveform *k*.

In addition to the pulses reflected from passing car 16, it will be noted that the reception circuits pass a very large pulse corresponding to each transmitted pulse. These large pulses result from the proximity of receiving transducer 12 to transmitting transducer 11. These received transmission pulses are not desired and are effectively gated out by the "V" gate which controls gated amplifier 47.

The "V" gate potential is triggered by the two square wave outputs of multivibrator 20 (waveforms *a* and *d*). The negative-going portions of these square waves are fed to two millisecond time constants 41 and 42, respectively, resulting in the production of waveform *m*, which is then fed to inverter-amplifier 43 to produce a two millisecond square wave (waveform *n*). This waveform is referred to as the "time delay," since its only purpose is to determine the time interval between each transmission pulse and the "on" portion of the "V" gate. By virtue of this short "time delay," gated amplifier 47 effectively cuts out the large, undesired pulses corresponding to each transmission pulse.

The trailing, or negative-going, portion of "time delay" waveform *n* triggers 20 millisecond time constant 44, the output of which (waveform *p*) is placed on the grid of "V" gate generator 45, producing the desired "V" gate potential shown as waveform *q*. Thus, gated amplifier 47 is responsive only to pulses appearing on its grid (waveform *k*) from 2 to 22 milliseconds following each transmitted pulse. In other words, only pulses reflected from surfaces from 1 to 11 feet from transducer unit 9 (or transducer unit 10 when a vehicle is passing through lane L) are passed to detected signal inverter-amplifier 48.

It will be noted that the timing of the "V" gate is such that a four-foot non-detection zone is left in the center of the highway. This has been done to limit the probability of the simultaneous detection, by both the lane L and the lane R units, of a single vehicle which is partially on the wrong side of the center line of the highway.

Returning now to the assumed conditions, as car 16 passes through the beam of transmitting transducer 11 of transducer unit 9 (FIG. 1B), a series of pulses are reflected from its side to receiving transducer 12. Assuming that car 16 is travelling at approximately 90 m.p.h., there will be time for only about seven such reflected pulses to be received during its passage. These received reflected pulses are passed through the reception and detection circuits as explained above and are finally passed through gated amplifier 47, resulting in the production of waveform *r*. The pulses are then inverted by detected signal inverter-amplifier 48 (waveform *s*) and are fed to relay control time constant 49 in the grid circuit of relay control tube 50.

The value of relay control time constant 49 is designed so that a series of negative pulses occurring at the transmission pulse repetition rate will drive the grid of relay control tube 50 below cut-off and hold it below cut-off as long as the train of reflected pulses continues. (See waveform *t*. Note: waveforms *s* and *t* are shown on a longer time scale than the other waveforms of FIG. 7.)

The cutting off of relay control tube 50 allows detection relay DR to drop away. As soon as car 16 passes out of the beam of transmitting transducer 11, reflections are no longer received and the grid of relay control tube 50 returns to its normal potential, permitting relay control tube 50 to conduct once again. This restores detection relay DR to its normally picked-up position, and it is ready to detect the next passing vehicle.

The successive dropping-away and picking-up of detection relay DR indicates the passage of a vehicle, and, as is shown, this relay indication can be used to operate counter 51 or traffic control apparatus 52, such as signal lights, warning devices, etc.

Referring once again to FIG. 1B, it can be seen that car 16 also passes through the sonic beam transmitted by transmitting transducer 11 of transducer unit 10 which is monitoring lane L, and pulses are reflected from the left side of car 16 back to receiving transducer 12. Since the left side of car 16 is about fifteen feet from transducer unit 10 (see FIG. 1C), each reflected pulse is received about 30 milliseconds after its transmission.

Each pulse of sound energy reflected from the left side of car 16 and received by receiving transducer 12 of transducer unit 10 is amplified by broad band amplifier 35 of the lane L reception and detection unit (see FIGS. 2 and 3), each 20 kc. pulse then passing through tuned amplifiers 26 and 27 and rectifier-filter 28, and each 25 kc. pulse passing through tuned amplifiers 36 and 37 and rectifier-filter 38. Thus, these reflected pulses appear at the input to their respective signal gates 29 and 39 as shown by waveforms *h* and *j* in FIG. 5.

Since 20 kc. signal gate 29 and 25 kc. signal gate 39 are controlled, respectively, by the gating potentials shown as waveforms *d* and *a* (provided by multivibrator 20 as explained above), the reflected pulses arrive at their respective signal gates at a time when the gating potentials for their respective signal gates are "off," and they are not passed through to the remaining detection circuit. As shown by waveforms *k*, only the large, undesired pulses corresponding to each transmission pulse are passed through signal gates 29 and 39, and these unwatned pulses are gated out by the "V" gate, as explained above.

Since no negative pulses appear at point *s*, relay control tube 50 continues to conduct, maintaining lane L detection relay DR in its picked-up position. Thus, although reflections are received from car 16 by the lane L reception and detection circuits, these reflections are gated out and no detection occurs.

It can be seen from the above description that a passing vehicle can be detected only by the reception and detection circuits for the particular lane in which it is travelling. In this way, the two counters shown in FIG. 2 separately record the traffic passing in each direction. Also, separate controls can be operated dependent upon the traffic flow in each direction.

It is important to note that, since no roadside barriers are used to limit the distance covered by the sonic beams transmitted by each of the transducer units, pulses may be reflected from objects that are beyond the highway, such as signs, fences, buildings, etc. These objects may be located at a distance such that pulses reflected from them may be received following the transmission of another pulse of the same frequency.

Figure 6:
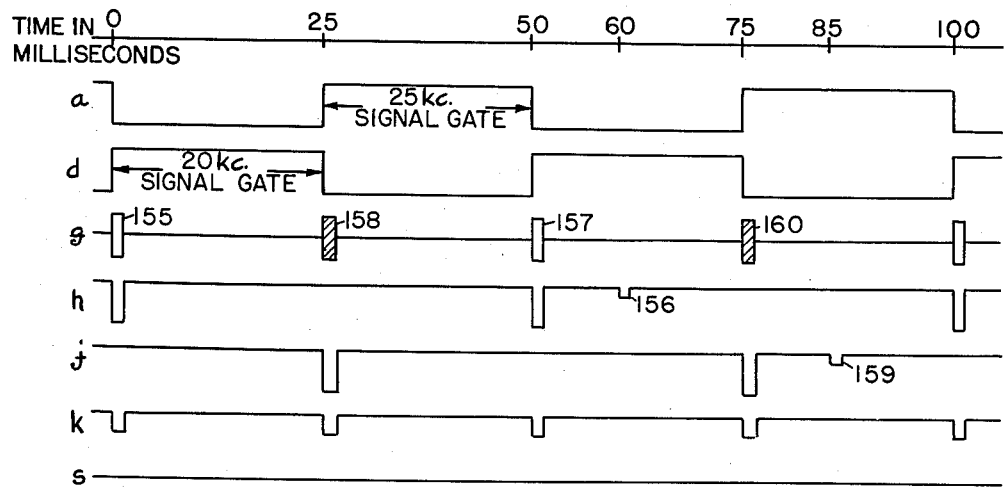
FIG. 6 is a chart showing certain of the waveforms of FIG. 4, assuming that pulses are being reflected from some remote object located beyond the highway.

For instance, pulses reflected from a fence 30 feet from a transducer unit would have transit time of approximately 60 milliseconds and would arrive during the "on" portion of signal gates 29 and 39 in the next succeeding cycle. Referring to FIG. 6, when 20 kc. transmission pulse 155 (waveform *g*) impinges on the fence, its reflected pulse 156 (waveform *h*) is received 60 milliseconds later and arrives during the "on" portion of the 20 kc. signal gate following the next successive 20 kc. transmission pulse 157. Similarly, 25 kc. transmission pulse 158 (waveform *h*) impinges on the fence, and its reflected pulse 159 (waveform *j*) is received 60 milliseconds thereafter during the "on" portion of the 25 kc. signal gate following the next successive 25 kc. transmission pulse 160.

However, as can be seen from wavefrom *k*, these pulses do not pass through to remainder of the detection circuit, due to the action of limiter 40 (FIG. 3). As was mentioned above, limiter 40 is a parallel-diode limiter having its anode biased above ground, and it sets an effective minimum potential which must be surpassed by pulses passing through signal gates 29 and 39.

Since the strength of reflected pulses varies inversely with the distance they travel, the pulses reflected from objects beyond the roadway, such as the fence in the example above, are considerably weaker than the pulses reflected from the sides of vehicles passing close to the transducer units through the monitored lane. By adjusting potentiometer P which controls the positive bias on the anode of limiter 40, it is a simple matter to discriminate against these spurious pulses reflected from objects beyond the roadway, while still assuring the accurate reception and detection of pulses reflected from vehicles passing through the monitored lane.

The invention as just described, not only detects high speed traffic, but also separately detects traffic moving in the different lanes monitored without requiring any special and expensive overhead mountings or any reflective barriers for limiting the distance through which the sound beam is transmitted. It should be noted that detection and counting is not dependent upon the number of axles of the passing vehicles, nor does it require any special cable or wave guides as would be necessary with radar-type detectors. Also, when the frequencies chosen are in the ultransonic range, the fur and feathers of animals and birds and the clothing of people will absorb rather than reflect the beamed sonic pulses, and, therefore, the circuit will detect only the passage of a vehicle in the particular lane being monitored, not being troubled by spurious responses.

*Single Frequency Modification for Slower Moving Traffic*

The invention herein can be modified and simplified for use with slower moving metropolitan traffic. Since lower speed vehicles take longer to pass through the transmitted sonic beam, a slower pulse repetition rate will still allow time for several pulses to be reflected from the side of the vehicle during its passage, and this slower pulse repetition rate obviates the necessity for a second transmission frequency and corresponding frequency gates, resulting in the simpler circuitry shown in FIG. 7.

Assuming that the invention is being used to monitor a city highway having dimensions as set out in FIG. 1C, symmetrical multivibrator 120 may be set to require 50 milliseconds per cycle, each flip-flop occurring in 25 millisecond intervals. This cycle time for the multivibrator is chosen so that each cycle will occur in approximately the transit time required for a transmitted pulse to travel across the highway and back to the transmitting transducer unit.

The negative-going portions of the square wave taken from one side of multivibrator 120 (waveform *aa* of FIG. 7) are fed to one millisecond time constant 121, resulting in waveform *bb* which excites 25 kc. ringing oscillator 122 into producing a series of one millisecond pulses of 25 kc. frequency. These pulses are passed through amplifier 123, filter 124 and power amplifier 125, and are converted to sound energy by transmitting transducer 11 (see waveform *cc*).

Pulses reflected from passing vehicles are received by receiving transducer 12, amplified by tuned amplifiers 126 and 127 (see waveform *ee*), and pass through rectifier-filter 128 to the input to gated amplifier 147 (see waveform *mm*).

Limiter 140 performs the same function in this circuit as limiter 40 in the high-speed detector which was explained above. Namely, it sets a minimum potential which must be surpassed in order for a pulse to pass to gated amplifier 147. However, since the reflected pulses at point "*mm*" are negative, parallel-diode limiter 140 is designed to pass only negative peaks, potentiometer P adjusting the bias below ground on the cathode of the diode limiter.

By the adjustment of potentiometer P, spurious pulses reflected from objects beyond the roadway are rejected on the basis of their relative weakness compared to pulses reflected from the sides of vehicles in the monitored lane.

The production of the "V" gate potential, which controls gated amplifier 147, is substantially as explained above in connection with the high-speed detection form. The negative-going portion of square wave *aa* of multivibrator 120 is fed to two millisecond time constant 142, resulting in waveform *gg* which, in turn, is fed to time delay inverter-amplifier 143 to produce "time delay" waveform *hh*. As was pointed out above, this waveform is used to delay the "on" portion of the "V" gate sufficiently to assure the gating out of the large pulses corresponding to each transmission pulse due to the proximity of receiving transducer 12 to transmitting transducer 11.

The negative-going portion of waveform *hh* is then fed to 20 millisecond time constant 144 producing waveform *jj* at the input to "V" gate generator 145. The resulting *kk* is used to gate amplifier 147. Since this potential is "on" for only 20 milliseconds following each transmission pulse, gated amplifier 147 passes only those pulses reflected from the sides of vehicles passing less than eleven feet from the transducer unit. That is, only pulses reflected from vehicles traveling in the particular lane being monitored are passed through gated amplifier 147. Pulses reflected from vehicles passing in the non-monitored lane, such as those represented by the dotted lines in waveforms *ee* and *mm*, are not passed to the remaining portions of the detection circuit.

Attention is once again called to the fact that the "on" potential of the "V" gate is designed to leave a no-detection zone in the center of the road to limit the probability of having a car which is partially on the wrong side of the center-line detected and counted by both lane units.

When a vehicle passes through the monitored lane, a train of successive reflected pulses is received and passed through gated amplifier 147 (see waveform *nn*), and appears at the output of detected signal inverter-amplifier 148 as a train of negative pulses (waveform *pp*).

This resulting train of negative pulses triggers relay control time constant 149 which is in the grid circuit of relay control tube 150. It should be obvious that the pulse repetition rate of this train of negative pulses is the same as the transmission pulse repetition rate determined by the cycling of multivibrator 120 which, as explained above, is varied in accordance with the dimensions of the monitored highway. Relay control time constant 149 is designed so that when it is triggered by a train of negative pulses occurring at the predetermined pulse repetition rate, the grid of relay control tube 150 will be driven below cut off and held there as long as the pulse train continues. (See waveform *qq*, and note the change of time scale used with waveforms *pp* and *qq*.)

When relay control tube 150 is cut off, detection relay DR drops away, picking up again only after the vehicle has passed and pulses are no longer reflected back from its side. This relay indication of the passage of a vehicle in the monitored lane can be used to operate counter 151 and to operate control circuits for other traffic control apparatus 152.

As was mentioned above, reflections are also received from vehicles passing through the non-monitored lane. That is, as can be seen from FIG. 1B, pulses from lane L transducer unit 10 are reflected back to it from car 16 which is travelling along lane R. But, these reflected pulses are received more than 25 milliseconds after their transmission, since the side of car 16, from which the pulses are reflected, is more than thirteen feet from transducer unit 10. As was pointed out above, such reflected pulses (represented by dotted lines in waveforms *ee* and *mm* in FIG. 8) are received during the "off" portions of the gating potential controlling gated amplifier 147, and these pulses are not passed through to the remaining portions of the detection circuit.

It can be seen that this modification has the same general features as were discussed above in relation with the form designed to monitor high-speed traffic. Namely, people, animals and birds, will not be counted or otherwise detected as vehicles; the equipment is easily transported and set up; and its centralized circuitry facilitates maintenance.

From the description given above of the modified form of the invention, it is apparent that discrimination between vehicles in the near lane and desired to be detected and those more remote and not desired to be detected, is accomplished in part by the use of gating circuits and also in part by reflection pulse amplitude discrimination. In the specific embodiment described, the repetition rate is selected to provide an interval between successive pulses corresponding to substantially twice the transit time of a pulse across both lanes of the highway. Vehicles in the more remote lane are discriminated against because reflections from such vehicles are not received before the end of the gating interval which establishes a limited time for the reception of a reflection following the transmission of each pulse. Vehicles which are still more remote cannot be discriminated against on this basis since the reflection of a sound pulse from such vehicles may readily occur within the gated interval occurring following the transmission of the next sound pulse. Reflections from vehicles which are this remote can, however, quite readily be discriminated against on the basis of their much lower amplitude.

Viewed from this aspect, the purpose of extending the interval between successive pulses so that it is longer than the transmit time for a pulse reflected from a vehicle in the nearer lane, is to provide for time gating discrimination against reflections which are not sufficiently reduced in amplitude, by reason of the object being sufficiently remote, to permit amplitude discrimination.

This generalized description should make it readily apparent to one skilled in the art that various modifications can be made to the timing circuits to modify the time interval demarcated thereby without departing from the teachings of this alternative form of the invention. For example, it may be desirable to limit the period during which reflected pulses will be effective to produce distinctive outputs, that is, to limit the "on" time of the "V" gate to a short interval such that distinctive outputs are produced only in response to reflections received from the sides of vehicles passing nearer than the center of the near lane. Since these reflections would all have considerable amplitude due to the relatively short distance they travel, it may then be found that it is no longer necessary to use time gating to discriminate against all pulses reflected from vehicles in the remote non-monitored lane. That is, because the "V" gate is thus limited to pass only stronger reflections, it may well be that reflections from objects or vehicles more distant than the middle of the remote lane, for example, might then be capable of being discriminated against on the basis of amplitude as compared with the reflected sound pulses received from vehicles in the near lane. This may be of advantage in certain instances since it permits a somewhat higher repetition rate and this, as mentioned before, has the effect of permitting detection of vehicles travelling at higher speeds.

The above comments have been made particularly with respect to the modified form of the invention, but they apply as well to the principal form of the invention as will be understood by one skilled in the art.

Having described two specific embodiments of the present invention it is desired to be understood that these forms are selected to facilitate in the disclosure of the invention rather than to limit the number of forms which it may assume. Also, it is to be further understood that various modifications, adaptations and alterations may be applied to the specific form shown to meet the requirements of practice, without in any manner departing from the spirit or scope of the present invention.

What I claim is:

1. In a system for detecting vehicles passing in one or more lanes of a multi-lane highway, transmitting means for beaming intermittent sonic pulses across said highway so that said intermittent pulses will impinge on the sonic-reflective surfaces of passing vehicles, said intermittent pulses alternating between at least two frequencies and the time between said successive transmission pulses being at least equal to twice the time required for sound to travel from said transmitting means across the lanes of said highway in which vehicles are to be detected, receiving means so located as to receive reflections of said sonic pulses from said passing vehicles, signal gating means controlled by said transmission means for rendering said receiving means responsive to reflected pulses of each said transmission frequency respectively only during a preselected time interval following the transmission of each pulse of the same said frequency and terminating prior to the expected reception of reflections of the next-transmitted sound pulse at the other frequency, detection gating means for rendering said receiving means responsive to reflected pulses of any said transmission frequency only during a time interval encompassing the expected time of reception of sound pulses from vehicles moving in said lanes in which said vehicles are intended to be detected, and indication means responsive to said reflected pulses of any said transmission frequency when said receiving means is rendered responsive to said reflected pulses for producing a distinctive signal corresponding to said reflected pulses.

2. The system according to claim 1 wherein said detection gating means includes limiter circuit means for rendering said indication means responsive to said reflected pulses only when the amplitude of said reflected pulses surpasses a predetermined minimum value, said minimum value representing the expected amplitude of a reflection pulse having a propagation time in excess of twice the period between successive transmitted sound pulses, whereby said indication means will not be responsive to transmitted pulses reflected from objects more distant than the opposite side of said highway.

3. In a system for detecting vehicles moving along a highway, transmitting means including a sound transducer being positioned and directed to transmit repetitive sound pulses across the path of said vehicles so as to impinge upon the sound reflecting surfaces thereof, said transmitting means causing successive of said sound pulses to be alternately at two different distinctive first and second frequencies, receiving means including a receiving transducer positioned and directed to be responsive to reflections of said transmitted pulses from said vehicles, gated frequency discriminating means acting on said receiving means and permitting said receiving means to provide an output signal in response to a received reflection signal at a particular one of said frequencies only in a predetermined interval beginning subsequent to the transmission of said pulse at said particular frequency and prior to the transmission of the next pulse at the other of said two frequencies, whereby reflections of each transmitted sound pulse having a total propagation time longer than the period between successive pulses and shorter than twice the period between successive pulses cannot produce an output signal from said receiving means.

4. The system of claim 3 which further includes means governed by the amplitude of said reflection pulses and jointly acting on said receiving means together with said discriminating means to control said receiving means to produce an output signal only in response to an input signal greater than that expected from an object so distant that the round-trip propagation time of a pulse between said transmitting and receiving transducers exceeds twice the period between successive transmitted pulses.

5. In a system for detecting the presence of an object, transmitting means including a transducer for transmitting repetitive energy pulses towards said object and with successive pulses having respectively different frequencies but with the transmission of a pulse of a particular frequency being repeated cyclically with a period at least equalling the round trip propagation time of a pulse between said transducer and said object to be detected, receiving means selectively responsive to reflections of said energy pulses from said object, frequency discriminating means governed by said transmitting means and controlling said receiving means to produce an output signal in response to a reflection pulse having any one particular frequency only for a preselected interval beginning after the transmission of the pulse of that particular frequency and terminating prior to the expected reception of reflections from said object which result from the next-transmitted energy pulse having that same particular frequency, and means being distinctively controlled by the output of said receiving means when said receiving means responds to said reflections for indicating the presence of said object.

6. The system of claim 5 and further including means controlling said receiving means to produce an output signal only in response to a reflection pulse having an amplitude exceeding a predetermined value, said predetermined value at least exceeding the expected amplitude of a reflection pulse having a round-trip propagation time in excess of the period between successive pulses of the same frequency.

7. The system of claim 5 wherein said energy pulses are compressional wave energy pulses.

8. A system for separately detecting and registering the presence of vehicles traveling in at least one preselected lane of a highway, transmitting means including a transducer for emitting repetitive energy pulses which are successively of different distinctive frequencies but with each frequency being repeated cyclically with a period at least equalling the round-trip propagation time between said transducer and a vehicle in said preselected lane, said transducer being so positioned that said pulses impinge upon the energy reflective surfaces of said vehicles in said preselected lane but also impinge at times upon the reflective surfaces of objects not in said preselected lane, receiving means being selectively responsive to reflections of said energy pulses, frequency discriminating means governed by said transmitting means and controlling said receiving means to produce an output signal in response to a received reflection signal having a particular frequency only during a predetermined interval beginning subsequent to the transmission of said pulse at said particular frequency and terminating prior to the expected reception of reflections from the next-transmitted pulse of that same particular frequency, and means being distinctively controlled by the output of said receiving means for indicating the presence of a vehicle in said particular lane.

9. The system as defined in claim 8 which further includes means governed by the amplitude of the reflected pulses received by said receiving means for controlling said receiving means to produce an output pulse only in response to an input pulse having an amplitude at least greater than that expected for a reflection pulse received from an object so distant that its round-trip propagation time exceeds the period between successive pulses of the same frequency.

10. The system of claim 8 wherein said energy pulses are sound pulses and said transducer is an electro-acoustical transducer.

References Cited in the file of this patent

UNITED STATES PATENTS

| | | |
|---|---|---|
| 1,982,341 | Hitchcock | Nov. 27, 1934 |
| 2,108,090 | Turner | Feb. 15, 1938 |
| 2,560,587 | Miller | July 17, 1951 |
| 2,759,783 | Ross | Aug. 21, 1956 |
| 2,826,753 | Chapin | Mar. 11, 1958 |
| 2,871,459 | Berry | Jan. 27, 1959 |

FOREIGN PATENTS

| | | |
|---|---|---|
| 785,001 | Great Britain | Oct. 23, 1957 |